E. C. F. OTTO.

VELOCIPEDE WHEEL.

No. 10,760. Reissued Aug. 24, 1886.

Witnesses.

Chas. H. Smith

J. Stail

Inventor

Edward C. F. Otto for Lemuel W. Serrell atty

UNITED STATES PATENT OFFICE.

EDWARD C. F. OTTO, OF PECKHAM, COUNTY OF SURREY, ENGLAND.

VELOCIPEDE-WHEEL.

SPECIFICATION forming part of Reissued Letters Patent No. 10,760, dated August 24, 1886.

Original No. 369,355, dated December 16, 1884. Application for reissue filed February 27, 1885. Serial No. 157,270. Patented in England November 17, 1883, No. 5,433.

*To all whom it may concern:*

Be it known that I, EDWARD CARL FREDERICK OTTO, subject of the Queen of Great Britain, residing at Peckham, in the county of Surrey, England, have invented certain new and useful Improvements in Velocipede-Wheels, of which the following is a specification.

Figure 3:
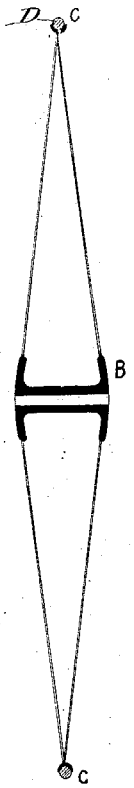
Figure 1:
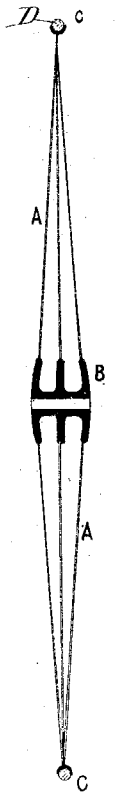
Figure 2:
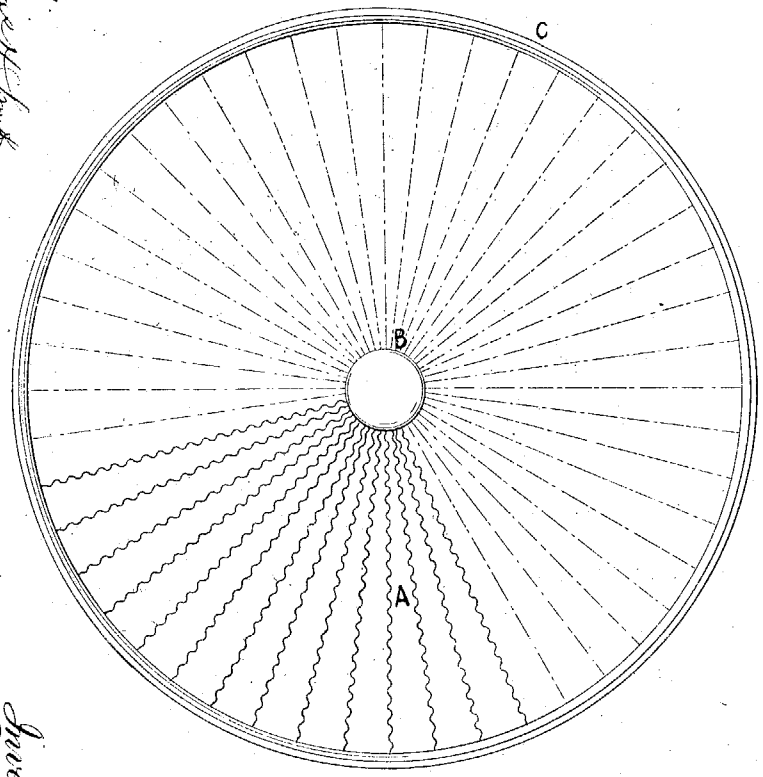

In the drawings, Figure 1 is a vertical section through a velocipede-wheel with three sets of elastic spokes, and Fig. 2 an end view of same. Fig. 3 is a vertical section through a velocipede wheel with two sets of elastic spokes.

In the spider-wheels now generally used for velocipedes there are two sets of spokes, which are held in great tension, which insure lightness and a certain amount of strength vertically or radially, but, on the other hand, produces a state of unstable equilibrium, so that a comparatively light blow against one side of the wheel by collision with some object causes the immediate buckling of the rim and collapse of the whole wheel.

According to this invention, I construct a velocipede-wheel in which the deleterious effect of lateral and other blows is greatly diminished, and which also possesses great lightness, strength, and elasticity, and which may at the same time (when constructed with two outer sets of my improved spokes and one central set of such spokes) advantageously be made considerably narrower at the nave than those now in use.

The rim of my improved velocipede-wheel is, by preference, made of steel, and is provided with an elastic tire, which may suitably be of india-rubber, and the spokes are made undulating or wave-shaped, and that either undulating in one direction only, or twisted or helical. These numerous light steel spokes are at their outer ends formed with heads, which are countersunk into the rim. The inner ends of the spokes are screwed into holes in the flanges formed on the hub or nave. These highly-elastic spokes are given what I call a "yielding tension," which gradually absorbs the blow or vibration, and the tension will also, in case of a blow, be increased in a much smaller ratio than in the ordinary straight spokes of velocipede-wheels.

In Fig. 1 I have shown such a velocipede-wheel with three sets of spokes, A, of an undulating or helical or twisted form. Fig. 2 is an end view of the wheel. Fig. 3 shows a velocipede-wheel with two sets of undulating or twisted spokes, A, arranged similarly relatively to the rubber tire D, rim C, and nave B.

The rubber tire D by itself would only reduce to some extent the first shock or blow to the machine from the inequalities of the road and the effects of vibration; but the aforesaid numerous light elastic spokes, mounted and adjusted so as to have only a comparatively slight but constant tension, as stated, serve to further reduce the aforesaid shocks or blows and effects of vibration. Neither would the elastic spokes, without the elastic or rubber tire, be of any use for a velocipede-wheel, because of the imperfect grip on the road. But by this combination of the elastic tire and the elastic yielding tensional spokes, I, on the one hand, absorb the greater part of said shocks before they enter or affect the axle of the velocipede-wheel, and I, on the other hand, produce a sufficient grip on the ground for driving purposes, and, thirdly, I produce a more stable equilibrium, and reduce the effect of lateral blows. Therefore, a wheel such as described in specification of Fisk's patent, No. 294,025, or in specification of Buzzell's Patent, No. 98,920, would be quite unsuitable for and clearly never were intended for use for a driving-wheel in a velocipede where speed, grip on the road, and the rider's comfort are essential. By making the spokes of an undulating or helical form, and by mounting them relatively to the elastic tire in the manner described, I am enabled advantageously to reduce the tension of the spokes, and thus to make it a yielding tension, and that not only as regards lateral accidental blows, but in a general sense as to all blows caused by the inequalities of the road, thus producing more ease and comfort in riding, a better grip on the ground, a greater speed over rough ground, and less wear and tear of the machine.

I claim as my invention—

1. In velocipede-wheels, the tensional elastic spokes A, in combination with a rim and elastic tire, substantially as and for the purposes set forth.

2. A velocipede-wheel consisting of a rim formed to receive an india-rubber tire, a flanged nave, B, and two sets of radial tensional undulating steel spokes, in combination with a central set of radial undulating elastic steel spokes of a proportionately greater tension, all the said spokes being fastened to the rim and screwed into the flanges of the nave, substantially as described.

E. C. F. OTTO.

Witnesses:
JOHN DEAN,
W. J. NORWOOD,
*Both of* 17 *Gracechurch Street, London, E. C.*